United States Patent
Akbulut et al.

(10) Patent No.: US 10,616,148 B2
(45) Date of Patent: Apr. 7, 2020

(54) PROGRESSIVELY EXTENDING CONVERSATION SCOPE IN MULTI-USER MESSAGING PLATFORM

(71) Applicant: International Business Machines Corporation, Armonk, NY (US)

(72) Inventors: Muhtar B. Akbulut, Waban, MA (US); David P. George, Eastleigh (GB); Collin J. Murray, Lynnfield, MA (US); Dan O'Connor, Milton, MA (US); David D. Taieb, Charlestown, MA (US)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 15/810,566

(22) Filed: Nov. 13, 2017

(65) Prior Publication Data
US 2019/0149489 A1 May 16, 2019

(51) Int. Cl.
G06F 15/16 (2006.01)
H04L 12/58 (2006.01)
G06N 20/00 (2019.01)
H04L 12/18 (2006.01)

(52) U.S. Cl.
CPC ............. H04L 51/02 (2013.01); G06N 20/00 (2019.01); H04L 12/1822 (2013.01); H04L 51/16 (2013.01)

(58) Field of Classification Search
CPC ................................ H04L 51/02; H04L 51/16
See application file for complete search history.

(56) References Cited

U.S. PATENT DOCUMENTS

| 9,117,447 | B2 | 8/2015 | Gruber et al. |
| 2017/0048170 | A1 | 2/2017 | Smullen et al. |
| 2017/0132019 | A1 | 5/2017 | Karashchuk et al. |
| 2018/0108066 | A1* | 4/2018 | Kale ........................ G06N 3/02 |

OTHER PUBLICATIONS

De Bayser, Maira G. et al., "A Hybrid Architecture for Multi-Party Conversational Systems", Cornell University Library, arXiv:1705.01214v2 [cs.CL], HAL. Id: hal-01520491, http:hal.upmc.fr/hal-01520491, May 4, 2017, 41 pages.

\* cited by examiner

*Primary Examiner* — Hua Fan
(74) *Attorney, Agent, or Firm* — Stephen R. Tkacs; Stephen J. Walder, Jr.; William J. Stock

(57) ABSTRACT

A mechanism is provided in a data processing system comprising at least one processor and at least one memory, the at least one memory comprising instructions which are executed by the at least one processor and configure the processor to implement a conversation scope system, comprising a conversation scope controller and a conversation scope extractor, for progressively extending conversation scope in a multi-user messaging platform. The conversation scope controller captures an utterance input by a user into a chat platform. The conversation scope extractor determines a conversation scope for the utterance based on at least one entity extracted from the entity. The conversation scope controller directs the utterance to a messaging chat room based on the determined conversation scope.

20 Claims, 3 Drawing Sheets

PROGRESSIVELY EXTENDING CONVERSATION SCOPE IN MULTI-USER MESSAGING PLATFORM

BACKGROUND

The present application relates generally to an improved data processing apparatus and method and more specifically to mechanisms for progressively extending conversation scope in a multi-user messaging platform.

Online chat may refer to any kind of communication over the Internet that offers a real-time transmission of text messages from sender to receiver. Chat messages are generally short in order to enable other participants to respond quickly. Thereby, a feeling similar to a spoken conversation is created, which distinguishes chatting from other text-based online communication forms such as Internet forums and email. Online chat may address point-to-point communications as well as multicast communications from one sender to many receivers and voice and video chat, or may be a feature of a web conferencing service. Online chat in a less stringent definition may be primarily any direct text-based or video-based, one-on-one chat or one-to-many or many-to-many group chat (also known as chat room or channel), using tools such as instant messengers, Internet Relay Chat (IRC), talkers, and possibly multi-user dungeons (MUDs).

The term chat room, or chatroom, is primarily used to describe any form of synchronous conferencing, occasionally even asynchronous conferencing. The term can thus mean any technology ranging from real-time online chat and online interaction with strangers (e.g., online forums) to fully immersive graphical social environments. The primary use of a chat room is to share information via text with a group of other users. Generally speaking, the ability to converse with multiple people in the same conversation differentiates chat rooms from instant messaging programs, which are more typically designed for one-to-one communication. The users in a particular chat room are generally connected via a shared internet or other similar connection, and chat rooms exist catering for a wide range of subjects.

Collaborative software or groupware is application software designed to help people involved in a common task to achieve their goals. In terms of the level of interaction it allows, collaborative software may be divided into: real-time collaborative editing (RTCE) platforms that allow multiple users to engage in live, simultaneous, and reversible editing of a single file (usually a document), and version control (also known as revision control and source control) platforms, which allow separate users to make parallel edits to a file, while preserving every saved edit by every user as multiple files that are variants of the original file. Collaborative software is a broad concept that overlaps considerably with computer-supported cooperative work (CSCW). Software products such as email, calendaring, text chat, wiki, and bookmarking belong to this category whenever used for group work, whereas the more general term social software applies to systems used outside the workplace. The use of collaborative software in the work space creates a collaborative working environment (CWE).

A chatbot (also known as a talkbot, chatterbot, bot, IM bot, interactive agent, or Artificial Conversational Entity) is a computer program that conducts a conversation via auditory or textual methods. Such programs are often designed to convincingly simulate how a human would behave as a conversational partner, thereby passing the Turing test. Bots are typically used in dialog systems for various practical purposes including customer service or information acquisition. Some bots use sophisticated natural language processing systems, but many simpler systems scan for keywords within the input, then pull a reply with the most matching keywords, or the most similar wording pattern, from a database.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and at least one memory, the at least one memory comprising instructions which are executed by the at least one processor and configure the processor to implement a conversation scope system, comprising a conversation scope controller and a conversation scope extractor, for extending conversation scope in a multi-user messaging platform. The method comprises capturing, by the conversation scope controller executing on the at least one processor of the data processing system, an utterance input by a user into a chat platform. The method further comprises determining, by the conversation scope extractor executing on the at least one processor of the data processing system, a conversation scope for the utterance based on at least one entity extracted from the entity. The method further comprises directing, by the conversation scope controller, the utterance to a messaging chat room based on the determined conversation scope.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
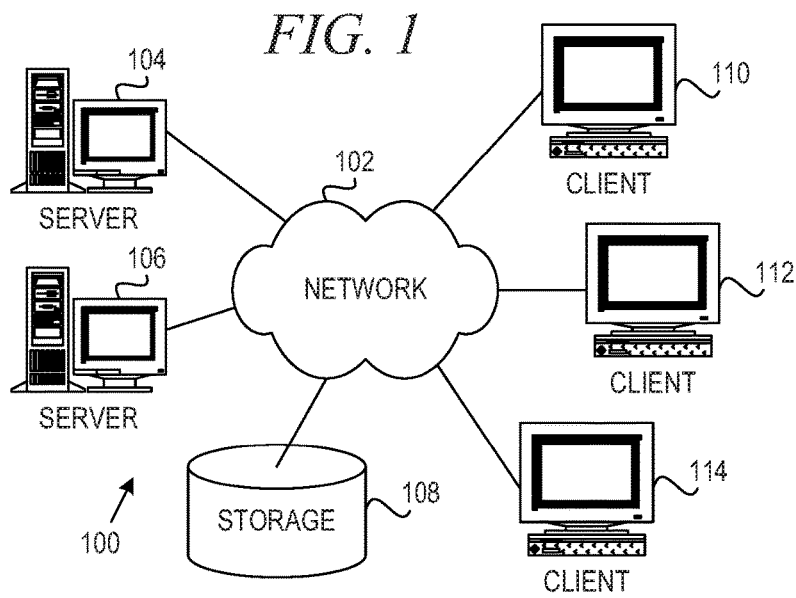
FIG. 1 is an example diagram of a distributed data processing system in which aspects of the illustrative embodiments may be implemented.

Collaborative chat applications have become the center of development and operations for many companies. In addition to providing persistent and instant messaging capability, these systems have also become (1) the repository for key information (attachments and integrations into document systems), (2) a common "command-line" interface for operations using bots, and (3) a forum to find experts and decision makers and to get answers to questions. However, chat or messaging platforms have become overwhelming for users. It is typical for a popular chat room to have hundreds of users with tens of simultaneous different active conversation scopes at any given time. A single chat room can have simultaneous communications ranging from a new team member looking for a document link to an administrator running a script to upgrade a critical component in production.

The illustrative embodiments use cognitive technology and bots to progressively increase the conversation scope as a response to a user utterance in a chat application. As used herein, the term "conversation scope" is a defined as the extent of the domain of the conversation and the number of human and bot participants. A human asking one bot to deploy a component is a participant of a small-scope conversation, whereas five new hires trying to get onto an intranet in an infrastructure chat room with a few operations team members are participants of a large-scope conversation.

Instead of sending every user utterance to a chat room, the mechanism of the illustrative embodiments helps the user get what he or she needs. The mechanism progressively increases the conversation scope, if the user cannot complete the task, as follows:

1. User utterance is captured by the system. The utterance may be a question, a valid script call, a request to execute a task, or any combination of the above. The utterance may be pure text, text mixed with graphical-text (e.g., emoticon or emoji), or graphical user interfaces (GUIs) (e.g., a poll).

2. The system performs a search in the chat history to find answers using enhanced information retrieval (IR) based on machine learning models. If a high confidence answer is found, it is presented to the user. As an example, the utterance, "is our intranet down again?" may have been answered by a user in an existing chat, and system may retrieve the answer without involving users in a chat chat room.

3. The system searches for a bot in the bot registry data structure that can perform the task for the user. For instance, the utterance, "deploy latest UI to stage," may be acted upon by a bot without involving other users.

4. The system searches for active communications in chat rooms to which the user is subscribed and extracts conversation scopes to the user using artificial intelligence (AI) techniques, such as "summarization" and other machine learning approaches.

5. The system searches for the experts who may know the answer to the question and propose a direct message (DM) or a list of users to message for the utterance.

6. The system searches chat rooms and proposes the appropriate chat room for the question or utterance. For example, for a given utterance, the system may respond as follows: "Instead of 'service-developers' chat room you may want to ask this question in 'service-operations' chat room."

The system may also use the chat history and user reactions, perhaps labeled and annotated by a subject matter expert, to train the bots and machine learning models to help refine the conversation scope for the user.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
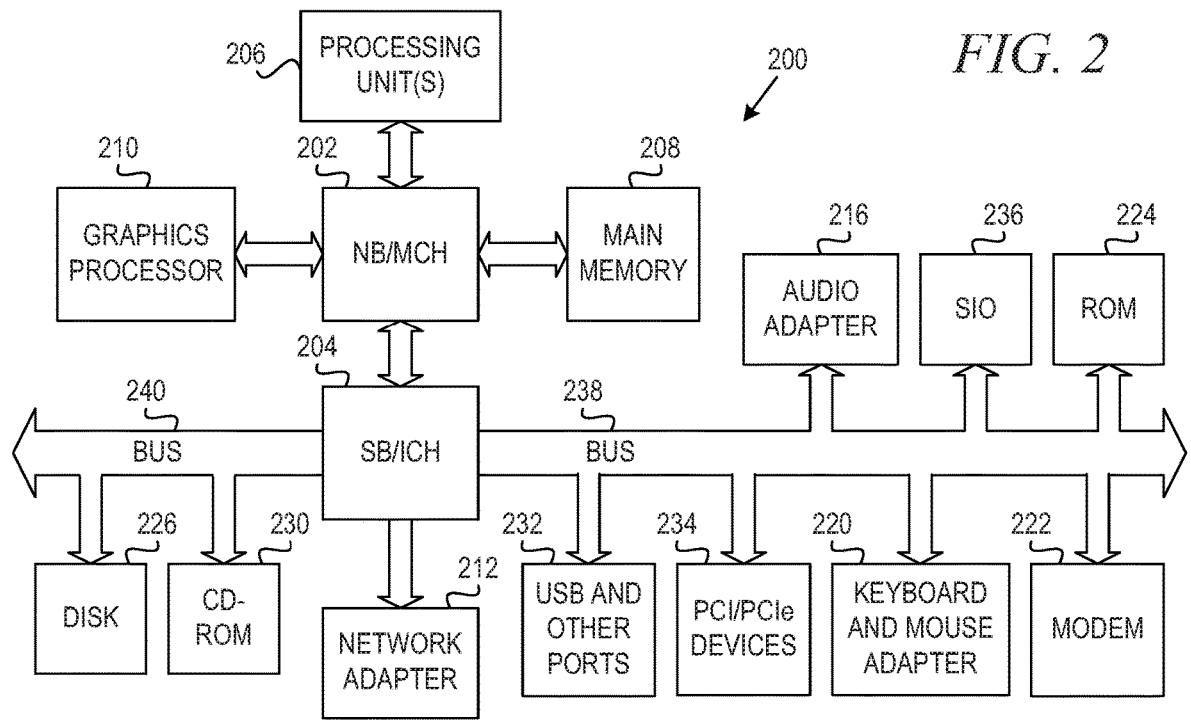
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a mechanism for progressively extending conversation scope in a multi-user messaging platform. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates progressively extending conversation scope in a multi-user messaging platform.

As noted above, the mechanisms of the illustrative embodiments utilize specifically configured computing devices, or data processing systems, to perform the operations for progressively extending conversation scope in a multi-user messaging platform. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the mechanism for progressively extending conversation scope in a multi-user messaging platform.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Chat applications and other software have encouraged collaboration. As a result, chat applications started to turn into platforms that integrate with third party applications, allowing users to perform a variety of application lifecycle management tasks, in addition to text-based instant messaging. However, the primarily textual interface of the messaging platform and the increased number of users (hundreds to thousands) and chat rooms (dozens) put a lot of burden on the user to perform tasks.

The tasks performed by users can be categorized into the following five categories based on the user's objectives and the challenges the user is burdened with:

1. Access to existing knowledge: Search chat room and private messaging history to find an answer that may exist, typically with only basic information retrieval (IR) support.

2. Automation: Find the right bot for the right task and extract means to interact with it to perform a task.

3. Question and answer (Q&A) in a specific domain: Find the right user(s), expert(s), or chat room for a question in a specific domain.

4. General Q&A: Search for answers in multiple chat rooms with multiple users.

5. Extract useful information from multiple conversation scopes: Piece out the right information from the resulting output from all of the above.

The illustrative embodiments complement a chat platform to help users perform these tasks more easily by progressively extending conversation scope using cognitive technology. The conversation scope is managed from both sides of the interaction as follows:

1. Exposing user utterance: The system attempts to help the user without involving any human (starting with bots) and directs the utterance to potential experts and then to the right chat room.

2. Limiting response to utterance: The answer to a question is often embedded in a conversation, or it only makes sense in the scope of a conversation. The system identifies the correct conversation scope (among several going at the same time) and only presents the relevant parts to the user.

Figure 3:
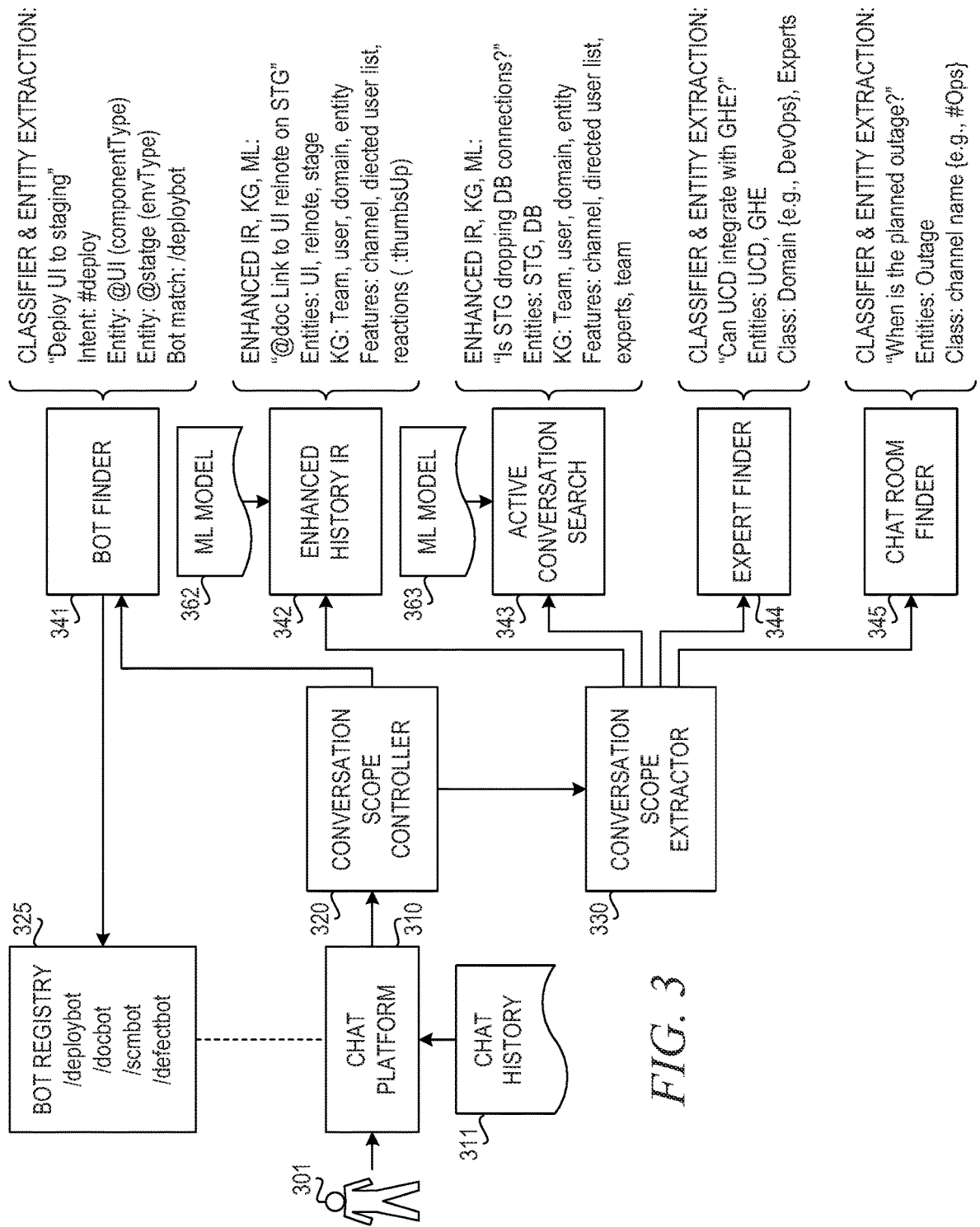
FIG. 3 is a block diagram depicting a system for progressively extending conversation scope in a multi-user messaging platform in accordance with an illustrative embodiment.

FIG. 3 is a block diagram depicting a system for progressively extending conversation scope in a multi-user messaging platform in accordance with an illustrative embodiment. The system uses cognitive techniques that can be used by each component. The system integrates with chat platform 310, which provides persistent- and instant-messaging capabilities. Bot registry data structure 325 may be a part of chat platform 310 or may be provided by a third-party system for writing bots to perform tasks.

Conversation scope controller 320 monitors all the conversation in the chat platform 310. Conversation scope controller 320 does not itself provide a response or perform a task for the user but works with components that have cognitive capabilities to identify opportunities to help user 301.

Bot finder component 341 attempts to match a bot or a human user to an utterance from user 301. For example, the user may express a need to deploy a particular bot to build a development environment. Bot finder component 341 uses bot registry data structure 325 to identify an appropriate bot to complete the task. Bot finder component 341 uses a classifier and entity extraction. As an example, given the utterance, "Deploy UI to staging," bot finder component 341 determines an intent (#deploy), a first entity (@UI), and a second entity (@stage). In one example embodiment, the "#" prefix indicates an intent and the "@" prefix indicates an entity. Bot finder component 341 also determines an entity type for each extracted entity. Bot finder component 341 then performs a bot match using bot registry data structure 325. For the above example, bot finder component 341 may match the utterance to the following bot: "deploybot."

If the system determines with certainty that a bot can perform a task, all that is needed is to summon that bot. However, for all other cases, there is a need to extract the conversation scope. For example, if the system is searching for relevant active conversations, the system must perform a search, run ML models, filter out text and users, etc. to extract the scope (e.g., "conversations and experts about the production problem with authentication system").

Enhanced history information retrieval (IR) component 342 searches chat history data structure 311 to find answers from previous conversations between humans and bots. Enhanced history IR component 342 may attempt to perform enhanced history IR in response to determining a bot cannot be found by bot finder component 341. The answer may be in a past answer to the same or similar question. Enhanced history IR component 343 may use feature-based IR to find the right answer from chat history data structure 311 based on the user's utterance. Enhanced history IR component 342 may, for example, use enhanced IR, knowledge graph (KG), and machine learning (ML) with ground truth (GT). Given the example utterance, "@doc Link to UI relnote on STG," enhanced history IR component 342 may identify the following entities: UI, relnote, and stage. Enhanced history IR component 342 may, for example, use the knowledge graph that captures relationships between teams, users, domains, and entities. Enhanced history IR component 342 uses the following features: chat room, directed user list, reactions. Enhanced history IR component 342 may, for example, use machine learning model 362 to search previous conversations in chat history data structure 311. In one embodiment, machine learning model 362 is trained using a labeled training set, such as a previous chat history labeled by a subject matter expert. Note that the features and models are just examples of specific embodiments.

Active conversation search component 343 is an enhanced search component that searches active conversations to find answers to the utterance of user 301. Active conversation search component 343 may attempt to find answers in active conversations in response to the determining an answer could not be found in chat history data structure 311 by enhanced history IR component 342. The answer may be a topic of an active conversation. Active conversation search component 343 can use feature-based IR to find a conversation based on the utterance of user 301. Active conversation search component 343 may, for example, use enhanced IR, knowledge graph, and machine learning (ML). Given the example utterance, "Is stage environment dropping DB connections?" active conversation search component 343 identifies the following entities: stage environment, DB. Active conversation search component 343 may use a knowledge graph that tracks relationships among team, user, domain, and entity. Active conversation search component 343 may use the following features: chat room, directed user list, experts, and team. History is typically available in archives and about conversations that have ended. Active conversations are the conversations going on right now. A search in history/archive will return text from past conversations. A search for active conversations will place the user in an active conversation with which he or she can engage.

Expert finder component 344 attempts to match a human expert user to an utterance of user 301. Expert finder component 344 may attempt to match a human expert user to the utterance in response to no active conversation being found by active conversation search component 343. For example, the user may ask a specific question about an error encountered in a particular development environment. Based on the chat history data structure 311, activity, and positive reaction to a human user's response, an expert can be identified by the system. Expert finder component 344 uses a classifier and entity extraction. Given the example utterance, "Can the deployment system integrate with our version control system?" expert finder component 344 identifies the following entities: "deployment system", "version control system." Expert finder component 344 may use a classifier to classify the utterance into "intergationQuery" intent. With these entities and intents, the system can return an answer from conversation archives.

Chat room finder component 345 determines whether the utterance is targeted for the correct chat room. Chat room finder component 345 may attempt to determine whether the utterance is targeted for a particular chat room in response to determining an expert user is not found by expert finder component 344. It is common for a user desperate for an answer to guess a chat room and target an entire chat room with an utterance only to be chastised by annoyed participants and accused of poor chat etiquette. Chat room finder component 345 may, for example, use a classifier and entity extraction. Given the example utterance, "When is the planned outage?" chat room finder component 345 identifies the following entities: outage. Chat room finder 345 may use a classifier to classify the utterance into a class that matches the appropriate chat room names.

Conversation scope extractor 330 gets involved when the scope of the conversation must be calculated. Conversation scope extractor 330 can (1) extract only conversations that relate to the user's utterance (e.g., only user-A and user-C talking about the latest PagerDuty alert) or (2) use IR in the active chat room conversation (e.g., archive search returns an answer from user-A about the latest PagerDuty alert in "provisioning chat room") and conversation scope extractor 330 extracts all conversation between a subset of users on the specific topic.

Using components 341-345, the system progressively extends the conversation scope. Thus, when user 301 submits an utterance to chat platform 310, the system first attempts to answer the utterance by opening a conversation including the user 301 and an identified bot. If a bot cannot be found to answer the user's utterance, the system attempts to answer the utterance by returning an answer from chat history data structure 311. If an answer cannot be found in the chat history data structure 311, the system attempts to find an answer in an active conversation. If an answer cannot be found in an active conversation, then the system attempts to open a conversation or chat room with the user 301 and one or more expert users. If an expert user cannot be found, then the system attempts to direct the user's utterance to an appropriate chat room.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
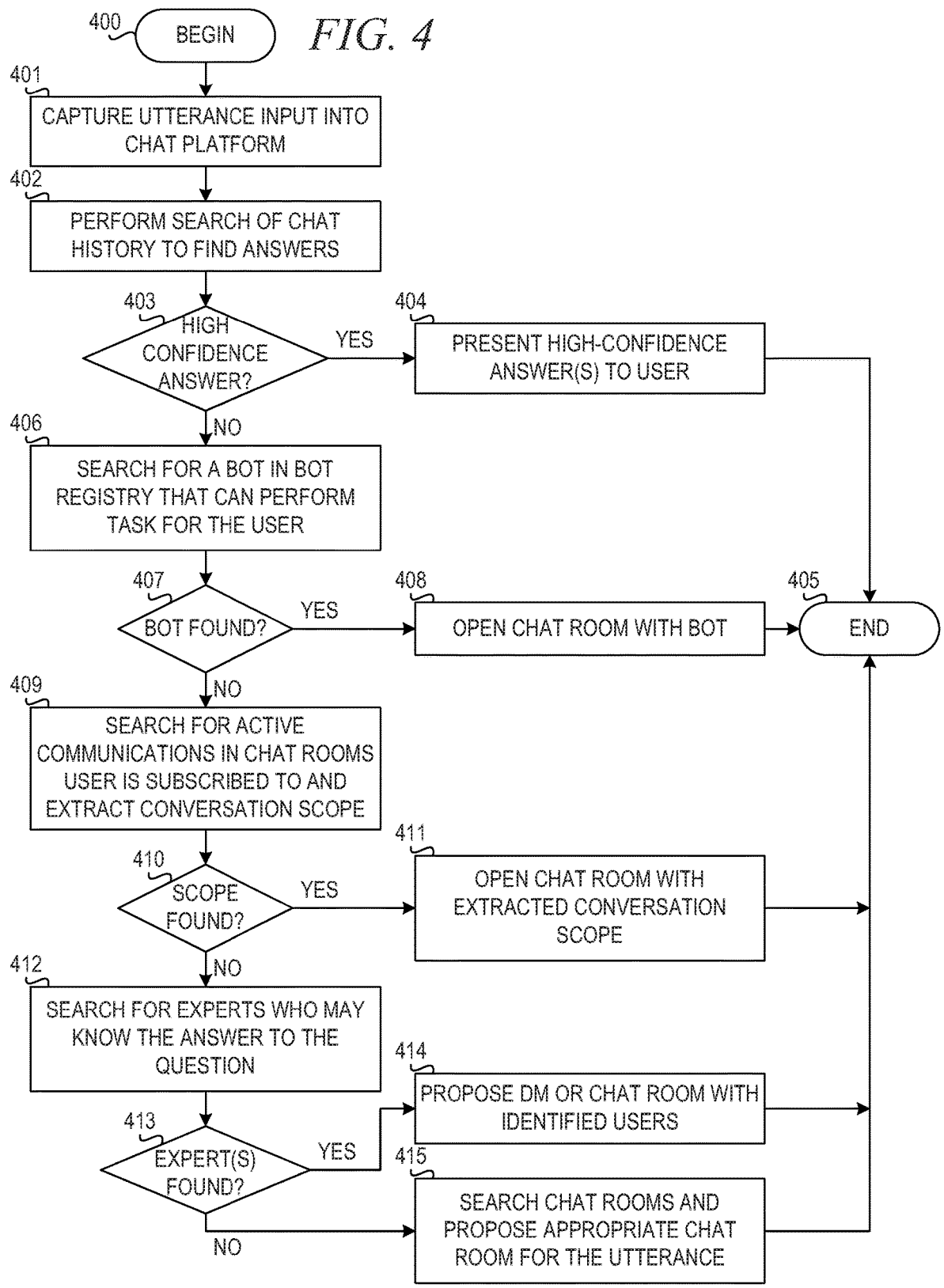
FIG. 4 is a flowchart illustrating operation of a system for progressively extending conversation scope in a multi-user messaging platform in accordance with an illustrative embodiment.

FIG. 4 is a flowchart illustrating operation of a system for progressively extending conversation scope in a multi-user messaging platform in accordance with an illustrative embodiment. Operation begins (block 400), and the system captures an utterance input into a chat platform by a user (block 401). The utterance may be a question, a valid script call, a request to execute a task, or any combination of these. The utterance may be pure text or text mixed with graphical text, such as emoticons or emoji, or graphical user interface (GUI) components, such as a poll to get votes.

The system performs a search in the chat history to find answers (block 402). The system may perform the search using enhanced information retrieval (IR) based on machine learning (ML) models. In one embodiment, the system generates one or more candidate answers and generates a confidence score for each of the candidate answers. The system determines whether a high confidence answer (i.e., a confidence score greater than a threshold value) is found (block 403). If the system finds a high confidence answer, then the system presents the high confidence answer(s) to the user (block 404), and operation ends (block 405).

If a high confidence answer is not found in block 403, then the system searches for a bot in the bot registry data structure that can perform the task for the user (block 406). For example, the system may search for a bot based on intent and entity. The system determines whether a bot is found that can perform the task in the utterance (block 407). If a bot is found, the system opens a chat room with the bot and the user (block 408). Thereafter, operation ends (block 405).

If a bot is not found in block 407, the system searches for active communications in chat rooms the user is subscribed to and extracts conversation scopes to the user (block 409). For example, the system may search for active communications using artificial intelligence (AI) techniques like "summarization" and ML. The system determines whether conversation scope is found (block 410). If conversation scope is found, then the system opens a chat room with the extracted conversation scope (block 411), and operation ends (block 405).

If a conversation scope is not found in block 410, then the system searches for experts who may know the answer to the question, if any, and propose a direct message (DM) or list of users to message for the utterance (block 412). The system determines whether an expert is found (block 413). If an expert is found, then the system proposes a DM or chat room with identified users (block 414), and operation ends (block 405).

If an expert is not found in block 413, then the system searches chat rooms and proposes an appropriate chat room for the utterance (block 415). Thereafter, operation ends (block 405).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions which are executed by the at least one processor and configure the processor to implement a conversation scope system, comprising a conversation scope controller and a conversation scope extractor, for extending conversation scope in a multi-user messaging platform, the method comprising:

capturing, by the conversation scope controller executing on the at least one processor of the data processing system, an utterance input by a user into a chat platform;

performing a search of a chat history data structure using enhanced information retrieval (IR), at least one knowledge graph, and machine learning (ML) to find an answer to the utterance;

responsive to determining that a high confidence answer is not found for the utterance, searching, by the conversation scope controller, a bot registry data structure for a bot that performs a task requested by the utterance;

responsive to determining that a bot is not found to perform a task requested by the utterance, searching, by the conversation scope controller, for an active communication in messaging chat rooms the user is subscribed to and extracting, by the conversation scope extractor, conversation scope related to the utterance;

responsive to determining that a conversation scope is not found in an active communication in messaging chat rooms, searching, by the conversation scope controller, for human expert users who can answer the utterance; and responsive to determining that human expert users are not found to answer the utterance, searching, by the conversation scope controller, messaging chat rooms and proposing, by the conversation scope controller, a target messaging chat room for the utterance.

2. The method of claim 1, further comprising:
responsive to finding a high confidence answer to the utterance presenting the high confidence answer to the user.

3. The method of claim 1, wherein performing the search of the chat history data structure comprises:
generating one or more candidate answers based on entities extracted from the utterance, at least one knowledge graph, and a set of features;
generating a confidence score for each of the one or more candidate answers; and
comparing each confidence score to a threshold value.

4. The method of claim 1, further comprising:
responsive to finding a given bot that performs the task requested by the utterance, opening a chat room with the given bot and the user.

5. The method of claim 1, further comprising:
responsive to extracting conversation scope, opening a chat room with the extracted conversation scope for the user.

6. The method of claim 1, further comprising:
responsive to finding one or more human expert users who can answer the utterance, suggesting a direct message or user list including the one or more human expert users to the user.

7. The method of claim 1, wherein searching for an active communication in messaging chat rooms the user is subscribed to comprises using a classifier to classify the utterance into a class that matches a chat room name.

8. A computer program product comprising a non-transitory computer readable storage medium having a computer readable program stored therein, wherein the computer readable program comprises instructions, which when executed on a processor of a computing device causes the computing device to implement a conversation scope system, comprising a conversation scope controller and a conversation scope extractor, for extending conversation scope in a multi-user messaging platform, wherein the computer readable program causes the computing device to:
capture, by the conversation scope controller executing on the at least one processor of the data processing system, an utterance input by a user into a chat platform;

perform a search of a chat history data structure using enhanced information retrieval (IR), at least one knowledge graph, and machine learning (ML) to find an answer to the utterance;

responsive to determining that a high confidence answer is not found for the utterance, search, by the conversation scope controller, a bot registry data structure for a bot that performs a task requested by the utterance;

responsive to determining that a bot is not found to perform a task requested by the utterance, search, by the conversation scope controller, for an active communication in messaging chat rooms the user is subscribed to and extracting conversation scope to the user;

responsive to determining that a conversation scope is not found in an active communication in messaging chat rooms, search, by the conversation scope controller, for human expert users who can answer the utterance; and responsive to determining that human expert users are not found to answer the utterance, search, by the conversation scope controller, messaging chat rooms and propose, by the conversation scope controller, a target messaging chat room for the utterance.

9. The computer program product of claim 8, wherein computer readable program further causes the computing device to:
responsive to finding a high confidence answer to the utterance, present the high confidence answer to the user.

10. The computer program product of claim 8, wherein performing the search of the chat history data structure comprises:
generating one or more candidate answers based on entities extracted from the utterance, at least one knowledge graph, and a set of features;
generating a confidence score for each of the one or more candidate answers; and
comparing each confidence score to a threshold value.

11. The computer program product of claim 8, wherein the computer readable program further causes the computing device to:
responsive to finding a given bot that performs the task requested by the utterance, opening a chat room with the given bot and the user.

12. The computer program product of claim 8, wherein the computer readable program further causes the computing device to:
responsive to extracting conversation scope, opening a chat room with the extracted conversation scope for the user.

13. The computer program product of claim 8, wherein the computer readable program further causes the computing device to:
responsive to finding one or more human expert users who can answer the utterance, suggesting a direct message or user list including the one or more human expert users to the user.

14. The computer program product of claim 8, wherein searching for an active communication in messaging chat rooms the user is subscribed to comprises using a classifier to classify the utterance into a class that matches a chat room name.

15. An apparatus comprising:
at least one processor; and
a memory coupled to the at least one processor, wherein the memory comprises instructions which, when executed by the at least one processor, cause the processor to implement a conversation scope system, comprising a conversation scope controller and a conversation scope extractor, for extending conversation scope in a multi-user messaging platform, wherein the instructions cause the at least one processor to:

capture, by the conversation scope controller executing on the at least one processor of the data processing system, an utterance input by a user into a chat platform;

perform a search of a chat history data structure using enhanced information retrieval (IR), at least one knowledge graph, and machine learning (ML) to find an answer to the utterance;

responsive to determining that a high confidence answer is not found for the utterance, search, by the conversation scope controller, a bot registry data structure for a bot that performs a task requested by the utterance;

responsive to determining that a bot is not found to perform a task requested by the utterance, search, by the conversation scope controller, for an active communication in messaging chat rooms the user is subscribed to and extracting conversation scope to the user;

responsive to determining that a conversation scope is not found in an active communication in messaging chat rooms, searching, by the conversation scope controller, for human exert users who can answer the utterance; and responsive to determining that human exert users are not found to answer utterance, search, by the conversation scope controller, messaging chat rooms and propose, by the conversation scope controller, a target messaging chat room for the utterance.

16. The apparatus of claim 15,
wherein performing the search of the chat history data structure comprises:
generating one or more candidate answers based on entities extracted from the utterance, at least one knowledge graph, and a set of features;
generating a confidence score for each of the one or more candidate answers; and
comparing each confidence score to a threshold value.

17. The apparatus of claim 15, wherein the instructions further cause the at least one processor to:
responsive to finding a given bot that performs the task requested by the utterance, opening a chat room with the given bot and the user.

18. The apparatus of claim 15, wherein the instructions further cause the at least one processor to:
responsive to extracting conversation scope, opening a chat room with the extract conversation scope for the user.

19. The apparatus of claim 15, wherein the instructions further cause the at least one processor to:
responsive to finding one or more human expert users who can answer the utterance, suggesting a direct message or user list including the one or more human expert users to the user.

20. The apparatus of claim 15, wherein searching for an active communication in messaging chat rooms the user is subscribed to comprises using a classifier to classify the utterance into a class that matches a chat room name.

* * * * *